United States Patent [19]

Fukumoto et al.

[11] 3,867,156

[45] Feb. 18, 1975

[54] PROCESS FOR MANUFACTURING GRANULAR FOAMED PRODUCTS OF SILICA

[75] Inventors: Kenichi Fukumoto; Ryuji Nakamura, both of Osaka, Japan

[73] Assignee: Shikoku Kaken Kogyo Kabushiki Kaisha, Osaka-fu, Japan

[22] Filed: Feb. 16, 1973

[21] Appl. No.: 333,365

[30] Foreign Application Priority Data

Feb. 21, 1972 Japan.............................. 47-18332

[52] U.S. Cl. ............. 106/40 V, 106/98, 106/288 B, 106/40 R
[51] Int. Cl. ..................... C04b 21/00, C04b 35/14
[58] Field of Search .......................... 106/40 V, 40 R

[56] References Cited
UNITED STATES PATENTS

| | | | |
|---|---|---|---|
| 2,328,644 | 9/1943 | Happe | 106/40 R |
| 2,883,347 | 4/1959 | Fisher et al. | 106/40 R |
| 3,717,486 | 2/1973 | Fukumoto et al. | 106/40 V |
| 3,719,510 | 3/1973 | Temple et al. | 106/40 R |
| 3,744,984 | 7/1973 | Sato | 106/40 V |

*Primary Examiner*—Winston A. Douglas
*Assistant Examiner*—Mark Bell
*Attorney, Agent, or Firm*—Larson, Taylor and Hinds

[57] ABSTRACT

A process for manufacturing foamed product of silica which comprises adding a water-insoluble inorganic powder having a particle size of 0.05 to 100 $\mu$ to a silica sol to produce a uniform mixture, gelling the resulting mixture at a pH of not higher than 7 to produce hydrosilica gel, drying the gel obtained to remove sorbed water and firing the dried silica gel at 1000° to 1600°C to effect foaming, said water-insoluble inorganic powder being stable under the gelling condition of silica sol and infusible, not decomposable and nonvolatile under the firing condition.

11 Claims, No Drawings

PROCESS FOR MANUFACTURING GRANULAR FOAMED PRODUCTS OF SILICA

This invention relates to a process for manufacturing granular foamed products of silica which have a lightweight property and excellent mechanical strength and chemical resistance.

Inorganic lightweight foamed products have heretofore been well-known which are prepared by foaming natural minerals through firing. Also known are some inorganic foamed products prepared from artificially made materials. The properties of a foamed product obtained by firing a natural mineral are determined substantially by the properties of the natural mineral used. Further in the case of a foamed product prepared from an artificial material, it is at present difficult to change the characteristics of the product determined by the manufacturing process.

The present inventors have carried out researches to develop a process for manufacturing an inorganic lightweight foamed product by which the properties of the resulting product can be altered as desired, depending on the uses thereof.

It is well known that silica gel is excellent in noncombustibility and heat resistance, is stable chemically, and has large specific surface are and high hygroscopicity. It is employed as a catalyst carrier, dehumidifying agent and applied to like uses wherein these characteristics are utilized to advantage. However, because of excessively high hygroscopicity, silica gel has the drawback that in the presence of water or moisture it quickly absorbs water to break by itself, this rendering it serviceable only in a limited range of application. Foamed products from silica gel which are no longer hygroscopic, are noncombustible, resistant to heat, chemically stable and much more lightweight than silica gel have been produced. In preparing foamed products of this type from silica gel, the starting material is heated and foamed under specific firing conditions. This process was filed as U.S. patent application Ser. No. 92,150 on Nov. 23, 1970 and patented under U.S. Pat. No. 3,717,486 on Feb. 20, 1973.

However, the products obtained by this method still have some properties to be improved. For example, chemical resistance, particularly alkali resistance, is not sufficient in some uses. Further, other properties, such as mechanical strength and heat resistance are also desired to be improved in accordance with the uses of the products.

An object of the present invention is accordingly to provide an improved process for manufacturing foamed products of silica, which are not only lightweight and no longer hygroscopic but also excellent in chemical resistant property, particularly alkali resistant property.

Another object of the present invention is to provide a process for manufacturing foamed products of silica, whereby mechanical strength of the products is increased markedly.

Another object of the invention is to provide a process for manufacturing foamed products of silica which have improved and excellent heat resistance.

These and other objects of the invention will be apparent from the following description.

The process for producing foamed product of silica in accordance with the present invention comprises adding water-insoluble inorganic powder having a particle size of 0.05 to 100$\mu$ to a silica sol to produce a uniform mixture, gelling the resulting mixture at a pH of not higher than 7 to produce hydrosilica gel, drying the gel obtained to remove sorbed water and firing the dried silica gel at 1000° to 1600°C to effect foaming, said water-insoluble inorganic powder being stable under the gelling condition of silica sol and infusible, not decomposable and nonvolatile during the firing step.

According to the researches of the present inventors it has been found that when water-insoluble inorganic powder having the above properties is added to a silica sol and the silica gel obtained by gelling the mixture at a pH of not more than 7 is fired after drying, a foamed product of silica having greatly improved properties can be obtained without deteriorating foaming properties. The foamed product obtained by the present invention is not only lightweight and no longer hygroscopic but also has a high order of mechanical strength and excellent chemical resistance, particularly alkali resistance. In accordance with the present process it is possible, moreover, to improve various properties of the resulting foamed products, such as heat resistance, depending on the kind of inorganic powder to be used.

Generally employable as the starting material in the present invention is silica sol which is produced by the conventional method as by neutralization of water glass with acid such as hydrochloric acid, sulfuric acid, nitric acid, acetic acid, oxalic acid, etc. The water glass to be used has preferably a molar ratio of $Na_2O/SiO_2$ of between 1 : 1 and 1 : 4 and a solid concentration of 5 to 40% by weight. The neutralization of water glass is preferably carried out by pouring the water glass into an excess amount of acid to produce a silica sol having a pH of not higher than 7.

According to this invention, it is critical to use a water-insoluble inorganic powder as the powder to be added to silica sol. By the use of water-insoluble powder chemical resistance and other properties of the products can be improved, whereas if the powder is water-soluble no improving effect on the properties of the product can be attained. Generally, the powder having a particle size ranging from 0.05 to 100 $\mu$ is used in the invention. If the particle size is too great, it is difficult to disperse the powder uniformly in silica gel, with the resulting tendency that it becomes difficult to obtain a uniformly foamed product. Preferably particle size is in the range of 0.1 to 10 $\mu$. It is further required that the powder be stable under the gelling conditions for silica sol and infusible, nondecomposable and nonvolatile under the firing conditions. If it lacks one of the above properties the improving effect on the properties of the resulting products can not be attained.

Examples of the inorganic powder are powders of (1) ceramic raw materials, (2) metal oxides other than alkali metal oxides and (3) compound oxides of metals other than alkali metals. The ceramic raw materials include, for example, (a) siliceous minerals, such as, siliceous stone, silica sand, diatomaceous earth, pottery stone, etc.; (b) clay minerals, such as kaolin, acid clay, pyrophyllite, etc.; (c) aluminous minerals, such as, boehmite, gibbsite, bauxite, aluminous shale, etc.; (d) siliceous bittererdes, such as, talc, peridotite, serpentine, asbestos, etc.; (e) iron minerals, such as, iron ore, ocher, pyrite, chlorite, red mud, etc.; (f) titanium minerals, such as, ilmenite, rutile, titanite, etc.; (g) manganese minerals, such as, pyrolusite, rhodomite, etc.; (h)

chromium minerals, such as, chromite, etc.; (i) zirconium minerals, such as zircon, baddeleyite, etc.; and (j) nickel minerals, such as, granierite, etc. The metal oxides include, for example, ZnO, $Al_2O_3$, CdO, CaO, $Cr_2O_3$, CoO, $ZrO_2$, $SnO_2$, SrO, $TiO_2$, $Fe_2O_3$, FeO, CuO, PbO, NiO, $V_2O_5$, BaO, $Bi_2O_3$, BeO, MgO, $Mn_3O_4$, $MnO_2$, etc. Examples of compound oxides are $CoO.Al_2O_3$ $CoO.nSiO_2$, $CoO.Cr_2O_3.Al_2O_3$, $Co_3O_4.SiO_2.Al_2O_3.$-$Fe_2O_3.NiO.MnO$, $ZnO.SiO_2$, $CaO.WO_3$, $Fe_2O_3.MnO_2.Mn_3O_4$, $TiO_2.Al_2O_3$, $BaO.CrO_3$, $PbO.CrO_3$, $FeO.Cr_2O_3$, etc. Of these preferable are oxides of transition elements and minerals containing the same. Examples thereof are ilmenite, rutile, pyrolusite, chromite, zircon and like minerals and $Cr_2O_3$, CoO, $ZrO_2$, $TiO_2$, $Fe_2O_3$, FeO, NiO, $V_2O_5$, $Mn_3O_4$, $MnO_2$, $CoO.Al_2O_3$, $CoO.nSiO_2$, $CoO.Cr_2O_3.Al_2O_3$, $Co_3O_4.SiO_2.Al_2O_3.Fe_2O_3.NiO.MnO$, $Fe_2O_3.MnO_2.Mn_3O_4$, $TiO_2.Al_2O_3$, $BaO.CrO_3$, $PbO.CrO_3$, $FeO.Cr_2O_3$ and like oxides.

The amount of powder used can be suitably determined within a wide range depending upon the use of the final foamed product and the kind of powder to be used. However, it is preferable to use the powder in an amount of about 0.1 to 20% by weight, most preferably in an amount of about 0.2 to 10% by weight, based on the weight of $SiO_2$ in the silica sol, although it is possible to use a greater amount of powder. The powder can be used singly or admixture with one another. It may be added directly to silica sol, or it may be added in the form of aqueous dispersion or paste.

Silica sol is then gelled. It is required in the present invention that the gelation be conducted at a pH of not higher than 7; otherwise the specific surface area of the resulting silica gel would be markedly reduced, with the consequent tendency of incomplete foaming during the subsequent firing step. Insofar as the gelation is conducted at a pH of not higher than 7, it may be conducted in usual manner. For example, silica sol having a pH of not higher than 7, preferably 1 to 3, is left to stand at room temperature or heated for gelation. It is preferable to conduct the gelation at an elevated temperature of 40° to 70°C in order to accelerate the gelation. The silica gel thus prepared is then washed with water and dried so as to be substantially free of sorbed water. By washing with water a water-soluble component such as Glauber's salt or like alkali metal salt can be removed from the gel. There is no need to wash it out completely but it is rather preferable to allow such salt to remain in the gel in an amount of not more than 10 weight percent, preferably 0.5 to 5 weight percent, based on the solid weight, since foaming of silica gel is accelerated without any adverse effect by the presence of such a small amount of remaining salt. In the drying for removing sorbed water, silica gel is subjected to heating and/or reduced pressure. Usually, silica gel is heated at about 80° to 150°C for about 2 to 10 hours. Preferably, the drying is conducted so as to produce the dried silica gel having a specific surface area of at least 450 $m^2/g$, particularly 500 to 900 $m^2/g$. The silica gel to be used in the invention preferably has a bulk density of 0.4 to 0.8 $g/cm^3$ and a particle size ranging from 0.05 to 10 mm, particularly 0.1 to 5 mm.

According to this invention, the silica gel is subsequently fired for foaming. The firing is conducted at a temperature ranging from 1000° to 1600°C. In accordance with the present method the silica gel can be directly fired at the above temperature, or preferably pre-fired at 500° to 900°C and thereafter fired at 1000° to 1600°C. The latter method is especially effective for silica gel having a large particle size of more than 0.18 mm with the advantage of giving a uniformly foamed product having a high degree of foaming which is more excellent in mechanical strength than a product obtained without pre-firing. It is preferred to conduct pre-firing at a temperature of 550° to 750°C to reduce the specific surface area of dried silica gel by 1 to 80%, more preferably by about 10 to 50%. Since larger reduction of specific surface area may result in insufficient foaming during firing, the pre-firing may preferably be such that the pre-fired silica gel still has a specific surface area of at least 400 $m^2/g$. The reduction in specific surface area is determined by temperature and time, which may therefore be suitably selected. Determination of specific surface area referred to herein is conducted by BET method under the condition of 1-hour pumping treatment at 300°C. The adsorption gas used for the measurement was nitrogen gas for dried silica gel and ethylene gas for the foamed product obtained. When pre-firing is conducted before the firing step, water-insoluble inorganic powder to be added to silica sol should be stable under the gelling conditions and infusible, not decomposable and nonvolatile under pre-firing and firing conditions. The silica gel pre-fired is then fired at 1000° to 1600°C to effect foaming. The dried silica gel can be directly fired for foaming without pre-firing. In every case, preferably firing temperature is in the range of 1100° to 1500°C. Although the mechanism to form a foamed product has not been fully clarified, heating at the above-mentioned temperature vitrifies silica gel throughout its surface and partially closes the interior pores, while permitting the remaining hydroxyl groups to be released and expanded to water vapor, with the result that the vitrified silica gel undergoes expansion in its entirety. The firing step causes silica gel to expand to 1.5 to 10 times the original volume and the expanded mass is fixed in this state upon cooling. The firing atmosphere exerts hardly any influence on the expansion of the foamed product, so that firing may be conducted in various gases such as air, an inert gas, etc. or in vacuum. Heating may be conducted in an electric furnace, fuel oil furnace, gas furnace or some other suitable heating means. It is further possible to conduct firing in a molten glass or molten metal, which gives a unique glass or metal product incorporating therein a foamed product of this invention. Firing usually completes within a short period of 3 to 10 minutes, although longer time is applicable wihouot any adverse effect. After firing, the product will be cooled by suitable means, for example, cooling to room temperature slowly or quickly.

The granular siliceous foamed product of this invention is a foamed body of silica having a substantially nonhygroscopic vitrified surface and including in its interior a great number of semi-closed pores defined by vitrified partition walls. Further the shape of the granular siliceous foamed product of this invention varies greatly depending upon the kind of silica gel, foaming conditions and the like and may be almost precisely spherical, ellipsoidal or more complicated. The size of the foamed product also varies over a wide range, which is generally at least 0.2 mm in shorter diameter and not greater than 25 mm in longer diameter. However, it is possible to obtain smaller or greater granules, for instance, small granules having a diameter of about 0.1 mm. Depending upon the uses, granules of the desired size and shape may be selected or those of different sizes and shapes may be used in mixture. The size of the pores within the foamed product varies greatly depending upon the foaming conditions. It is generally preferable that pores ranging from 1 to 100 microns in diameter be uniformly present in the product.

The foamed product of this invention has in its interior a great number of pores, and consequently, it is very lightweight. Generally, it has a bulk density of not higher than about 0.6 g/cm³. It is very easy to produce a product having a specific surface area of not higher than 0.7 m²/g. Because of the small specific surface area and because the foamed product of this invention is covered with a substantially nonhygroscopic vitrified surface, the product has hardly any hygroscopicity. In fact, when left to stand for a long period under the atmospheric conditions, the present foamed product exhibits no hygroscopic action and even when left for 24 hours under saturated water vapor pressure at 30°C, it shows hygroscopicity of as low as up to about 0.5% by weight. Whereas the foamed product of this invention shows no hygroscopicity, it absorbs water through capillary phenomena. However, the product does not absorb water so quickly as to undergo collapse but remains stable over a prolonged period. The very characteristics of water absorption assure outstanding advantages in practical use. For instance, when incorporated in a paint, the foamed product of this invention gives condensation preventing paint. The foamed product of this invention produced by the two steps of pre-firing and principal firing is characterized by more uniform porosity in its interior and much greater mechanical strength.

The foamed product of this invention has not only the unique construction described and characteristics derived therefrom but also outstanding stability in chemical resistance against alkali. The researches by the present inventors have revealed that such excellent chemical resistance is ascribable to the use of silica gel prepared by uniformly dispersing a water-insoluble inorganic powder in silica sol and gelling the resulting sol at a pH of not higher than 7. In fact, the foamed product of this invention obtained by foaming the silica gel prepared by the above method has greatly improved resistance to chemicals as compared with a foamed product obtained by foaming commercial silica gel. This will be apparent from appended Examples. Such remarkable improvement in chemical resistance can be achieved through the use of any inorganic powder employable in the invention, although the result will vary slightly depending upon the kind of powder used.

Another prominent feature of this invention is the considerable freedom of imparting the desired properties to the foamed product achieved through optional selection of the powder used. The powdes to be used and the resulting effects peculiar thereto may be largely classified as follows:

1. Use of ceramic raw materials gives foamed products having high alkali resistance and high mechanical strengths. With these minerals, remarkably improved alkali resistance will be assured through one step of firing as well as through two steps of pre-firing and principal firing.
2. When metal oxides other than alkali metal oxides are used, the mechanical strength and alkali resistance of the product will be increased and it can be colored as desired, depending on the kind of metal oxide used. The two-step firing will result in much improved strength and heat insulating properties.
3. Compound oxides, when used, give a colored product having high mechanical strength and excellent alkali resistance. By the two steps of firing, heat resistance and mechanical strength of the product will be much improved.

Thus, the foamed product of the present invention can be used for various purposes wherein characteristics described above are required. They are particularly useful as building materials and aggregates for paint, cement, etc.

For a better understanding of the invention examples are given below. The physical properties shown in examples are determined by the following method.

Abrasion hardness (% by weight):

A porcelain ball mill was charged with 500 ml of foamed product passing through a 5-mesh screen but retained on a 10-mesh screen along with 20 porcelain balls (30 mm in diameter), and the mill was driven at 30 r.p.m. for 5 minutes. Granules not passing through a 20-mesh screen were separated out from the foamed product taken out of the mill, washed with water and dried. The weight of the granules was measured and expressed in terms of percentage relative to the weight of the charged original product. The ball mill used was 158 mm in inner diameter and 160 mm in depth.

Abrasion hardness (% by weight) = $(W_2/W_1) \times 100$ wherein $W_1$ is the weight of the charged original product and $W_2$ is the weight of the sample obtained after rotation and not passing through a 20-mesh screen.

Alkali resistance (% by weight):

Sample was immersed in 1N-NaOH aqueous solution and boiled for 2 hours. The alkali resistance was determined by the following equation:

Alkali resistance (% by weight) = $(Wb/Wa) \times 100$ wherein $Wa$ is the weight of the sample used and $Wb$ is the remaining weight of the sample after alkali treatment.

Compressive strength (kg/cm²·mm):

A cylinder, 100 mm in diameter and 80 mm in depth, was densely charged with 400 ml of a sample retained on a 8-mesh screen. The sample was subjected to a constantly increasing load by a piston rod. The sample was not broken under a small load, preventing the advance of the rod, but as the load increased the sample started to break, permitting the rod to advance deeper into the cylinder. The relation between the distance of advance of the rod in mm due to the breakdown of the sample and the required load in kg/cm² was expressed in a curve with the load plotted as ordinate vs. the distance as abscissa. The compressive strength was given by the following equation derived from the curve showing the initial relationship between the load and distance.

Compressive strength (kg/cm²·mm) = $\Delta R/\Delta d$ wherein $d$ is a distance of advance of rod and R is a load required for advancing.

EXAMPLE 1

Water glass having a molar ratio of $Na_2O/SiO_2$ of 1 : 2.9 and a $SiO_2$ concentration of 29% by weight was diluted with water to a $SiO_2$ concentration of 8.5% by weight. The diluted water glass was poured with stirring into 15 wt.% sulfuric acid to prepare silica sols having pH of 1.9 and 6.0 respectively. Chromium oxide ($Cr_2O_3$) having an average particle size of 1 $\mu$ was added to each sol in an amount of 2 wt.% based on the weight of $SiO_2$ in the sol, stirred to effect uniform dispersion and heated to 60°C for gelation to obtain a hydrosilica gel. The gel obtained was washed with water and dried at 200°C for 10 hours to obtain a silica gel. The silica gels thus prepared had a bulk density of about 0.8 g/cm³ and a specific surface area of 650 m²/g and contained 1.5% and 1.7% by weight of water-soluble components (Glauber's salt) respectively. A portion of each of the silica gels passing through a 10-mesh screen but retained on a 20-mesh screen was pre-fired at 700°C for 30 minutes and further fired in a rotary kiln at 1400°C for 6 minutes to obtain a foamed product. The properties of the foamed product are given in Table 1 below.

COMPARISON EXAMPLE 1

A foamed product was obtained in the same manner as in Example 1 except that silica sol having pH of 8.5 was prepared and subjected to gelation to produce hydrosilica gel. The properties of the foamed product are shown in Table 1 below.

COMPARISON EXAMPLE 2

A silica sol having pH of 3.0 was prepared in the same manner as in Example 1 and the sol was subjected in the same manner as in Example 1 except that chromium oxide was not added thereto. The resultant dried silica gel was fired in the same manner as in Example 1. The properties of the foamed product are set forth in Table 1 below.

Table 2 below was mixed with and uniformly dispersed in the silica sol of Comparison Example 2 above in an amount of 5% by weight, based on the weight of $SiO_2$ in the sol, and the resulting sol was left for 12 hours for gelation. The gel obtained was washed with water, then dried at 50°C and thereafter pre-fired at 650° to 700°C for 1 hour and 30 minutes in a tunnel kiln, followed by further firing at 1300°C for 8 minutes in a rotary kiln to obtain a foamed product. The properties of the products are given in Table 2 below. For comparison, Table 2 below also shows the results obtained by using an alumina powder having particles sizes in excess of 100 $\mu$.

Table 2

| No. | Particle size of $Al_2O_3$ ( ) | Foamed product | | | |
|---|---|---|---|---|---|
| | | Bulk density (g/cm³) | Abrasion hardness (wt.%) | Alkali re-sistance | Compressive strength (kg/cm².mm) (wt.%) |
| 1 | 20 – 50 | 0.40 | 98.3 | 90.4 | 4.9 |
| 2 | 1 – 10 | 0.36 | 99.1 | 93.2 | 5.4 |
| 3 | 0.05 – 1 | 0.35 | 97.7 | 95.6 | 5.3 |
| 4 | 120 –150 | 0.25 | 53.2 | 69.0 | 2.3 |

EXAMPLE 3

Various powders having particle sizes of 0.4 to 20 $\mu$ were added to the silica sol of Comparison Example 2 above in an amount of 5% by wight, based on the weight of $SiO_2$ in the sol. In the same manner as in Example 1, each of the sols thus obtained was gelled, washed with water and dried to prepare a silica gel containing about 0.6% by weight of a water-soluble component (Glauber's salt), which was fired at 1350°C for 10 minutes in a rotary kiln to obtain a foamed product.

Table 1

| No. | pH during gelation | Foamed product | | | | |
|---|---|---|---|---|---|---|
| | | Bulk density (g/cm³) | Color | Abrasion hardness (wt.%) | Alkali resistance (wt.%) | Compressive strength (kg/cm².mm) |
| Ex. 1 | | | | | | |
| 1 – a | 1.9 | 0.29 | Green | 99.1 | 87.1 | 2.9 |
| 1 – b | 6.0 | 0.26 | do. | 97.2 | 82.3 | 2.7 |
| Comp. 1 | 8.5 | 1.12 | do. | 99.5 | 10.6 | 5.4 |
| Comp. 2 | 3.0 | 0.23 | White | 54.5 | 68.4 | 2.2 |

EXAMPLE 2

Alumina powder having a particle size shown in Table 2 below was mixed with...

The properties of the foamed products are shown in Table 3 below. Sample No. 16 was prepared without using a powder.

Table 3

| No | Powder used | Foamed product | | | |
|---|---|---|---|---|---|
| | | Bulk density (g/cm³) | Color | Abrasion hardness (wt.%) | Alkali resistance (wt.%) | Compressive strength (kg/cm².mm) |
| 1 | Titanium dioxide | 0.32 | White | 75.4 | 96.4 | 3.2 |
| 2 | Zirconia | 0.39 | White | 76.3 | 98.1 | 3.4 |
| 3 | Manganese oxide | 0.38 | Light red | 74.9 | 97.4 | 2.9 |
| 4 | Zinc oxide | 0.30 | White | 70.4 | 92.1 | 3.7 |
| 5 | Tin oxide | 0.37 | White | 71.2 | 98.4 | 4.2 |
| 6 | Iron oxide | 0.35 | Red | 74.7 | 96.0 | 4.7 |
| 7 | Pottery stone | 0.31 | White | 71.4 | 93.6 | 2.7 |
| 8 | Kaolin | 0.29 | White | 70.2 | 94.8 | 2.9 |
| 9 | Aluminous shale | 0.40 | White | 75.0 | 98.4 | 3.5 |

Table 3 — Continued

| No | Powder used | Foamed product | | | | |
|---|---|---|---|---|---|---|
| | | Bulk density (g/cm³) | Color | Abrasion hardness (wt.%) | Alkali resistance (wt.%) | Compressive strength (kg/cm².mm) |
| 10 | Red mud | 0.45 | Red | 73.9 | 98.1 | 3.2 |
| 11 | Talc | 0.33 | White | 72.5 | 92.9 | 2.8 |
| 12 | Zircon | 0.38 | do. | 78.0 | 97.8 | 3.8 |
| 13 | Ilmenite | 0.36 | do. | 70.6 | 97.2 | 3.5 |
| 14 | Siliceous sand | 0.27 | do. | 72.1 | 94.1 | 2.9 |
| 15 | None | 0.23 | do. | 52.4 | 68.4 | 2.2 |

EXAMPLE 4

Various compound oxides having particle sizes of 0.5 to 2μ were added to the silica sol of Comparison Example 2 in an amount of 2% by weight based on the weight of $SiO_2$ in the sol. Each of the resulting sols was gelled, washed with water and dried in the same manner as in Example 1 to prepare a silica gel containing about 1.8% by weight of a water-soluble component (Glauber's salt). The silica gel was fired at 1300°C for 7 minutes to obtain a foamed product. The silica gel used was such that is passed through a 6-mesh screen but was retained on a 24-mesh screen. The properties of the foamed products are shown in Table 4 below.

Table 4

| No. | Compound oxide used | Foamed product | | | | |
|---|---|---|---|---|---|---|
| | | Bulk density (g/cm³) | Color | Abrasion hardness (wt.%) | Alkali resistance (wt.%) | Compressive strength (kg/cm².mm) |
| 1 | A | 0.39 | Yellow | 67.7 | 96.2 | 3.9 |
| 2 | B | 0.38 | Blue | 69.4 | 94.8 | 5.8 |
| 3 | C | 0.45 | Green | 72.1 | 96.8 | 6.4 |
| 4 | Not used | 0.29 | White | 50.1 | 65.8 | 2.0 |

Note: 1. Compound oxide A shows $TiO_2$, $NiO.Sb_2O_5$ ["Tipaque TY 50", trade mark, yellow pigment of Ishihara Sangyo Kabushiki Kaisha, Japan].
2. Compound oxide B shows $Cr_2O_3$, $ZnO.Al_2O_3$ ["Peacock 1001", trade mark, green pigment of Kabushiki Kaisha Katsurakemi, Japan].
3. Compound oxide C shows a 1:1 weight ratio mixture of Compound A shown above and $CoO.ZnO.Al_2O_3$ ["Green 2002", trade mark, green pigment of Kabushiki Kaisha Katsurakemi, Japan].

EXAMPLE 5

The silica gels obtained in Example 4 were prefired at 680°C for 40 minutes and then fired at 1300°C for 7 minutes, whereby foamed products having the properties shown in Table 5 below were obtained.

Table 5

| No. | Compound oxide used | Foamed product | | | | |
|---|---|---|---|---|---|---|
| | | Bulk density (g/cm³) | Color | Abrasion hardness (wt.%) | Alkali resistance (wt.%) | Compressive strength (kg/cm².mm) |
| 1 | A | 0.32 | Yellow | 95.6 | 97.9 | 4.3 |
| 2 | B | 0.31 | Blue | 96.5 | 98.7 | 9.0 |
| 3 | C | 0.34 | Green | 97.2 | 98.6 | 9.9 |

Note: Compound oxides A, B and C are the same as shown in Table 4 before.

EXAMPLE 6

A predetermined amount of zirconia ($ZrO_2$) having a particle size of 0.1 to 10 μ was added in amounts shown in Table 6 below to silica sol obtained in Comparison Example 2 and the resulting sol was treated in the same manner as in Example 1 to prepare a silica gel containing about 1.6% by weight of a water-soluble component. A foamed product was obtained by the same treatment as in Example 1. The properties of the resulting foamed product are given in Table 6 below.

Table 6

| No. | Amount* of $ZrO_2$ (wt.%) | Foamed product | | | |
|---|---|---|---|---|---|
| | | Bulk density (g/cm³) | Abrasion hardness (wt.%) | Alkali resistance (wt.%) | Compressive strength (kg/cm².mm) |
| 1 | 15 | 0.38 | 95.4 | 98.7 | 4.5 |
| 2 | 5 | 0.34 | 94.2 | 97.1 | 4.4 |
| 3 | 0.5 | 0.26 | 93.6 | 94.5 | 3.7 |
| 4 | 0.2 | 0.23 | 93.2 | 93.0 | 3.8 |
| 5 | 0.05 | 0.29 | 89.3 | 87.6 | 2.9 |

Note: * The amount of $ZrO_2$ in wt.% is based on the weight of $SiO_2$ in the sol.

What we claim is:
1. A process for manufacturing lightweight, non-hygroscopic foamed product of silica having a high order of mechanical strength and excellent chemical resistance which comprises adding to a silica sol at least one water-insoluble inorganic powder of ceramic raw material, metal oxides other than alkali metal oxides and compound oxides of metal other than alkali metal having a particle size of 0.05 to 100 μ to produce a uniform mixture, gelling the resulting mixture at a pH of not higher than 7 to produce hydrosilica gel, drying the gel obtained to remove sorbed water and firing the dried silica gel at 1000° to 1600°C to effect foaming, said water-insoluble inorganic powder being added to the silica sol in an amouont of 0.1 to 20% by weight, based on the weight of $SiO_2$ in the sol.

2. The process according to claim 1, in which said water-insoluble inorganic powder is at least one of ceramic raw materials.

3. The process according to claim 1, in which said water-insoluble inorganic powder is at least one of metal oxides other than alkali metal oxides.

4. The process according to claim 1, in which said water-insoluble inorganic powder is at least one of compound oxides of metals other than alkali metals.

5. The process according to claim 1, in which said water-insoluble inorganic powder has a particle size of 0.1 to 10 $\mu$.

6. The process according to claim 1, in which said amount of the water-insoluble inorgaic powder is in the range of 0.2 to 10% by weight, based on the weight of $SiO_2$ in the sol.

7. The process according to claim 1, in which said firing temperature is in the range of 1100° to 1500°C.

8. The process according to claim 1, in which said dried silica gel is first pre-fired at 500° to 900°C and fired at 1000° to 1600°C.

9. The process according to claim 8, in which said pre-firing temperature is in the range of 550° to 750°C.

10. The process according to claim 8, in which said firing temperature is in the range of 1100° to 1500°C.

11. A lightweight, non-hygroscopic foamed product prepared by the process of claim 1.

* * * * *